(12) United States Patent
Bader

(10) Patent No.: US 7,669,494 B2
(45) Date of Patent: Mar. 2, 2010

(54) GEAR BOX WITH TWO PINION SHAFTS

(75) Inventor: Josef Bader, Friedrichshafen (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 300 days.

(21) Appl. No.: 10/570,815

(22) PCT Filed: Sep. 4, 2004

(86) PCT No.: PCT/EP2004/009876
§ 371 (c)(1),
(2), (4) Date: Mar. 6, 2006

(87) PCT Pub. No.: WO2005/045281
PCT Pub. Date: May 19, 2005

(65) Prior Publication Data
US 2006/0288811 A1    Dec. 28, 2006

(30) Foreign Application Priority Data
Oct. 8, 2003   (DE) ................. 103 46 658

(51) Int. Cl.
*F16H 3/08* (2006.01)
(52) U.S. Cl. .................. 74/331; 475/331; 475/343
(58) Field of Classification Search ................. 475/331, 475/343, 346, 347; 74/331, 335
See application file for complete search history.

(56) References Cited

U.S. PATENT DOCUMENTS

| | | | |
|---|---|---|---|
| 3,335,616 A | 8/1967 | Perkins | |
| 4,369,668 A | 1/1983 | Pollak-Banda et al. | |
| 4,693,130 A | 9/1987 | Kotzur | |
| 4,807,493 A * | 2/1989 | Loeffler | 74/745 |
| 5,383,543 A | 1/1995 | Craft | |
| 5,609,062 A * | 3/1997 | Reynolds | 74/325 |
| 6,334,369 B1* | 1/2002 | Sandig | 74/413 |
| 6,997,076 B2* | 2/2006 | Menjak et al. | 74/409 |

FOREIGN PATENT DOCUMENTS

| | | |
|---|---|---|
| DE | 29 24 349 | 12/1980 |
| DE | 34 46 211 | 7/1986 |
| DE | 37 07 992 A1 | 9/1988 |
| DE | 196 04 824 A1 | 8/1997 |
| EP | 0 009 775 A1 | 4/1980 |
| EP | 0 645 557 A1 | 3/1995 |

* cited by examiner

*Primary Examiner*—David D Le
*Assistant Examiner*—Derek D Knight
(74) *Attorney, Agent, or Firm*—Davis & Bujold, P.L.L.C.

(57) ABSTRACT

A variable-speed gearbox comprises a main transmission (2) arranged in a housing (30) and a downstream range-change transmission (32), the range-change transmission having power distribution on two countershafts (12, 14). On a main shaft (4) of the main transmission (2), a gear wheel (6) is arranged in a radially movable manner which meshes with respective first gear wheels (8, 10) each on one of the countershafts. In the housing of the variable-speed gearbox, a drive output shaft (22) is radially and axially fixed which is connected a gear wheel (20) that meshes in each case with a second gear wheel (16, 18), respectively, on each of the countershafts. The gear wheel on the main shaft that meshes with the first gear wheels on the countershafts is maintained in its axial position relative to the drive output shaft by way of pressure combs (50, 52, 54, 56).

13 Claims, 1 Drawing Sheet

GEAR BOX WITH TWO PINION SHAFTS

This application is a national stage completion of PCT/EP2004/009876 filed Sep. 4, 2004 which claims priority from German Application Serial No. 103 46 658.4 filed Oct. 8, 2003.

FIELD OF THE INVENTION

The invention concerns a gearbox with two countershafts for power distribution.

BACKGROUND OF THE INVENTION

Modern, powerful vehicle gearboxes usually comprise a main transmission group with a multi-stage basic gear and an upstream or downstream splitter group and/or a downstream range gear group. In a gearbox housing, they mainly comprise an input shaft as a first shaft and a central or main shaft as a second shaft, which can also be the output shaft, as well as one or more countershafts. The input and main shafts are essentially concentric with one another.

Having regard to the running properties and smooth running, such gearboxes can be designed with helical gearing, at least for the forward driving range. The axial forces from the helical gearing have to be taken up by an axial bearing and transmitted to the housing.

Gearboxes with the structure described can have one or more countershafts.

In gearboxes with power distribution between two countershafts, the main transmission group comprises two shafts arranged essentially one behind the other, one of which, namely either the input shaft or the main shaft of the main transmission, is mounted radially and axially fixed, while the respective other shaft is mounted floating laterally, i.e., able to move radially to allow the necessary load equalization. In this, care should be taken that an easy swivelling motion of the floating shaft is possible.

In gearboxes with two countershafts, the load equalization can preferably be designed such that the input shaft is mounted fixed on the housing, the countershafts are fixed on the housing and the main shaft is mounted floating in the gear wheels involved in the force flow.

The known variable-speed gearboxes for goods vehicles have a three- or four-speed main or basic transmission section and an upstream or downstream splitter transmission as an auxiliary transmission, which doubles the number of gear speeds of the main transmission since it splits the transmission ratio steps of the main transmission. A range-change transmission downstream from the main transmission extends the ratio range of the main transmission. The range-change transmission can be in the form of a planetary gearset or in the form of an arrangement of spur gear wheels.

From EP-A1 0 009 775 a range-change transmission with spur gear wheels downstream from a main transmission with two countershafts for power distribution is known. The range-change transmission has two countershafts which are rotationally independent of the countershafts of the main transmission. A floating gear wheel is arranged on the main shaft of the gearbox, which meshes with a gear wheel on each of the countershafts of the range-change transmission. This gearbox does not have sufficient capacity for absorbing axial forces that result from the gearing.

From DE-A1 196 04 824 by the present Applicant, a variable-speed gearbox with a range-change transmission of planetary design has become known. On the gearing of the planetary transmission pressure combs are provided to take up the axial forces that result from the helical gearing. The content of DE-A1 196 04 824 is intended to be fully incorporated in the present application.

The purpose of the present invention is to improve the axial mounting in a gearbox with two countershafts for power distribution.

SUMMARY OF THE INVENTION

In a range-change transmission with spur gears, the gear wheel arranged on the main shaft, which meshes with gear wheels on the countershafts of the range-change transmission, reaches very high rotation speeds in the disengaged condition in the fast shift position of the range-change transmission. This makes mounting with axial bearings problematic. Accordingly, the invention proposes a variable-speed gearbox with a main transmission arranged in a housing and a downstream range-change transmission, in which the range-change transmission comprises power distribution to two countershafts and in which a gear wheel is arranged in a radially displaceable manner on a main shaft of the main transmission. This gear wheel meshing in each case with a first gear wheel on each respective countershaft and in which a drive output shaft is arranged radially and axially fixed in the housing of the variable-speed gearbox; to that shaft is connected a gear wheel which meshes in each case with a second gear wheel on each respective countershaft. Pressure combs are provided by way of a gear wheel on the main shaft which meshes with the first gear wheels of the countershaft is maintained in its axial position relative to the drive output shaft. More preferably, the countershafts are maintained in their axial position relative to the drive output shaft by way of pressure combs.

In a particularly advantageous embodiment of the invention, the gearwheel on the drive output shaft comprises pressure combs which are in contact with pressure combs formed on the second gear wheels of the countershafts in order to take up axial forces. The gear wheel on the main shaft has pressure combs which are in contact with pressure combs formed on the first gear wheels of the countershafts in order to take up axial forces.

Particularly advantageous is the drive output shaft, held radially and axially in the housing by a double conical-roller bearing arrangement.

In another advantageous embodiment, the countershafts have only one radial mounting in the housing, which preferably comprises roller bearings.

The countershafts and the gear wheel on the main shaft are guided and maintained axially with the help of the pressure combs. The lubrication of the pressure combs can take place from outside and is simple and effective. During the torque transmission by the gear wheels of the countershafts, no axial gear forces have to be taken up by the bearings and transferred to the housing. Thus, the axial mounting of the countershafts can be omitted and the countershafts need only be held in radial-mounting roller bearings. The entire gearset combination of the range-change transmission is fixed axially by the mounting of the drive output shaft.

Exact formation of the pressure combs on the gear wheel of the main shaft ensures that while the axial fixing is maintained, the necessary radial freedom of the movement is secured.

BRIEF DESCRIPTION OF THE DRAWING

The invention will now be described, by way of example, with reference to the accompanying drawing in which.

DETAILED DESCRIPTION OF THE INVENTION

Figure 1:
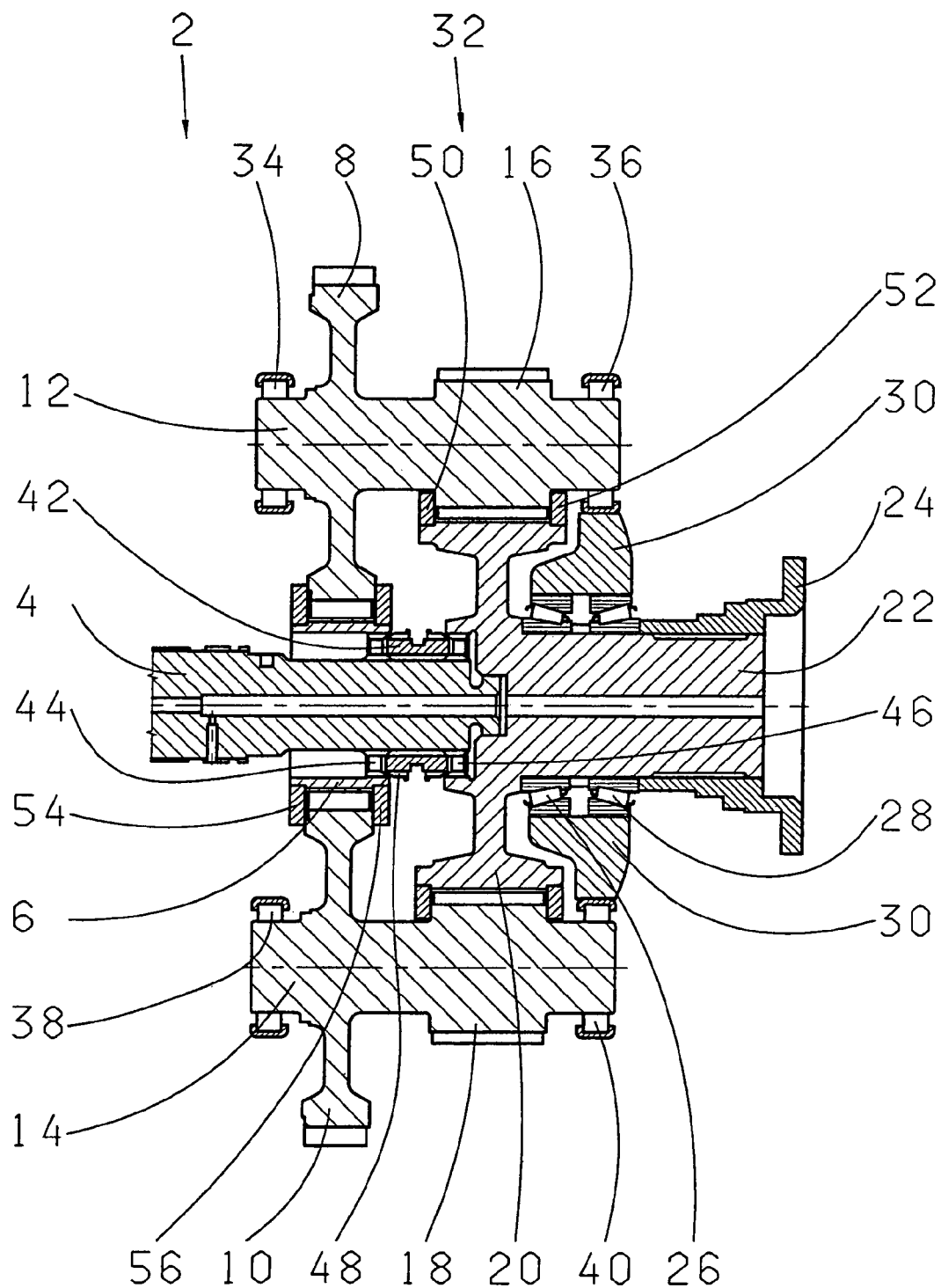
FIG. 1 is a diagrammatic gearbox with two pinion shafts.

In FIG. 1, in a variable-speed gearbox (not illustrated in greater detail), a main transmission 2 comprises a main shaft 4, at the end of which is arranged a gear wheel 6 with some radial play. For this, the radial mounting of the gear wheel 6 is provided with its outer teeth engaging only in the outer teeth of two first gear wheels 8 and 10. In each case, the first gear wheels 8 and 10 are fixedly arranged on respective countershafts 12 and 14 or formed as one piece with the countershafts. Each countershaft 12, 14 has a respective second gearwheel 16 and 18, in each case again fixed on its countershaft 12 and 14 or made as one piece with the countershafts 12, 14.

With their outer teeth, the two second gear wheels 16 and 18 mesh with the outer teeth on a gear wheel 20 arranged fixed on a drive output shaft 22 of the variable-speed gearbox or made as one piece therewith. To the drive output shaft 22 is attached a drive output flange 24 by which the variable-speed gearbox is connected to further elements of a vehicle drive train (not illustrated here).

The drive output shaft 22 is mounted by two conical-roller bearings 26 and 28 in a housing 30 of the variable-speed gearbox or of a range-change transmission 32 downstream from the main transmission 2. Also mounted in the housing 30 are the two countershafts 12 and 14, each in two roller bearings 34, 36 and 38, 40 respectively. These roller bearings 34, 36, 38, 40 only take up radial forces and transfer them to the housing 30. All the gear teeth of the gear wheels 8, 10, 16, 18, 20 are of the helical-tooth type from which axial forces result for the absorption and transfer of which the roller bearings 34, 36, 38, 40 are not suitable.

A gearshift sleeve 42 is arranged at the end of the main shaft 4 is which, by virtue of inner teeth, is connected with the main shaft 4 rotationally fixed but able to be displaced axially. By way of a control mechanism (not shown here), the gearshift sleeve 42 can be moved axially. When this happens, the gearshift sleeve 42 with its outer teeth 48 connects the main shaft 4 either with inner teeth 44 on the gear wheel 6 on the main shaft 4 or with inner teeth 46 of the drive output shaft 22 to form a direct connection between the main shaft 4 and the drive output shaft 22. If desired, the gearshift sleeve 42 can also adopt a neutral shift position in which there is no connection with either of the inner teeth sets 44, 46.

The drive output shaft 22 is mounted axially fixed in the housing 30 by means of the conical-roller bearings 26 and 28. Laterally on the outer teeth of the gear wheel 20 on the drive output shaft 22 respective pressure combs 50 and 52 are arranged. The pressure surfaces on the pressure combs 50 and 52 react with correspondingly formed pressure surfaces on the gear wheels 16 and 18, thereby fixing the countershafts 12 and 14 in the axial direction. Thereby, the gear wheels 8 and 10 on the countershafts 12 and 14 are also fixed axially.

Laterally on the outer teeth of the gear wheel 6 on the main shaft 4, respective pressure combs 54 and 56 are arranged. The pressure surfaces on the pressure combs 54 and 56 react with correspondingly formed pressure surfaces on the gear wheels 8 and 10 on the countershafts 12 and 14. Since the gear wheels 8 and 10 are axially fixed, as described above, the gear wheel 6 is also axially fixed by virtue of the pressure combs 54 and 56 so that the problems associated with axial mounting at high rotation speeds of the gear wheel 6 are eliminated.

REFERENCE NUMERALS 2 main transmission
4 main shaft
6 gear wheel
8 gear wheel
10 gear wheel
12 countershaft
14 countershaft
16 gear wheel
18 gear wheel
20 gear wheel
22 drive output shaft
24 drive output flange
26 conical-roller bearing
28 conical-roller bearing
30 housing
32 range-change transmission
34 roller bearing
36 roller bearing
38 roller bearing
40 roller bearing
42 gearshift sleeve
44 inner teeth
46 inner teeth
48 outer teeth
50 pressure comb
52 pressure comb
54 pressure comb
56 pressure comb

The invention claimed is:

1. A range-change transmission comprising:
an input shaft (4);
a gearshift sleeve (42), having radially outer teeth (48), being rotationally fixed to and axially slidable along an end of the input shaft (4) between at least first and second positions;
a first counter shaft (12) and a second counter shaft (14) each having a first gear wheel (8, 10) and a second gear wheel (16, 18) integrally formed therewith, each of the first and the second gear wheels (8, 10, 16, 18) having helical teeth;
a loose gear wheel (6), having radially inner teeth (44) and radially outer teeth, being rotationally supported by the input shaft (4), the loose gear wheel (6) engages the first gear wheel (8, 10) of the first counter shaft (12) and a second counter shaft (14), respectively;
a drive output shaft (22) being coaxially aligned with the input shaft (4), and the drive output shaft (22) having radially inner teeth (46) at an end located adjacent the input shaft (4);
an output gear wheel (20) being integrally formed with the drive output shaft (22) and having helical teeth, and the output gear wheel (20) engages the second gear wheels (16, 18) of the first counter shaft (12) and the second counter shaft (14);
first and second pressure combs (50, 52), being secured to and solely carried by opposite sides of the output gear wheel (20), maintain the output gear wheel (20) in axial alignment with the second gear wheels (16, 18) of the first and the second counter shafts (12, 14); and, an exterior surface of the first and the second counter shafts at a first axial end is radially supported on a housing by a first bearing and the exterior surface of the first and the second counter shafts at second axial end is radially supported by a second bearing.

2. The range-change transmission according to claim 1, wherein third and fourth pressure combs (54, 56), carried by opposed sides of the loose gear wheel (6), maintain the loose gear wheel (6) in axial alignment with the first gear wheels (8, 10) of the first and the second counter shafts (12, 14).

3. The range-change transmission according to claim 1, wherein the first and the second counter shafts (12, 14) are maintained in axial position, relative to the drive output shaft (22), by at least the first and the second pressure combs (50, 52).

4. The range-change transmission according to claim 1, wherein double conical-roller bearings (26, 28) radially and axially support the drive output shaft (22) within a gearbox housing (30).

5. The range-change transmission according to claim 1, wherein the first and the second counter shafts (12, 14) are only radially supported by a housing (30).

6. The range-change transmission according to claim 1, wherein the first and the second counter shafts (12, 14) are only radially supported by a housing (30) via roller bearings (34, 36, 38, 40).

7. A range-change transmission comprising:
an input shaft (4);
a gearshift sleeve (42), having radially outer teeth (48), being rotationally fixed to and axially slidable along an end of the input shaft (4) between at least first and second positions and a neutral position;
a first counter shaft (12) and a second counter shaft (14) each rotating about a rotational axis and having an integrally formed first gear wheel (8, 10) and an integrally formed second gear wheel (16, 18), the first and the second counter shafts (12, 14) each having a radially uninterrupted cross section extending from the axis of rotation to an outer surface of the counter shaft along a plane that is each having a radially uninterrupted cross section along a plane that is coincident with the respective rotational axis of the first and the second counter shafts (12, 14);
a loose gear wheel (6), having radially inner teeth (44) and radially outer teeth, being spaced from and surrounding the input shaft (4), the loose gear wheel (6) engaes the first gear wheel (8, 10) of the first counter shaft (12) and a second counter shaft (14), respectively;
a drive output shaft (22) being coaxially aligned with the input shaft (4), the drive output shaft (22) having radially inner teeth (46) at an end located adjacent the input shaft (4) and double conical-roller bearings (26, 28) radially and axially support the drive output shaft (22) within a housing (30);
an output gear wheel (20) being fixedly secured to the drive output shaft (22), and the output gear wheel (20) engaging the second gear wheels (16, 18) of the first counter shaft (12) and the second counter shaft (14);
double conical-roller bearings (26, 28) radially and axially support the drive output shaft (22) within a gearbox housing (30);
a first pair of pressure combs (54, 56) are solely carried by opposed sides of the loose gear wheel (6) for maintaining the loose gear wheel (6) in axial alignment with the first gear wheels (8, 10) of the first and the second counter shafts (12, 14), and the first pair of pressure combs (54, 56) are laterally located on outer teeth of the loose gear wheel (6) for solely centering the loose gear wheel (6) relative to the first gear wheels (8, 10) of the first and the second counter shafts (12, 14); and
a second pair of pressure combs (50, 52) are solely carried by opposed sides of the output gear wheel (20) for maintaining the output gear wheel (20) in axial alignment with the second gear wheels (16, 18) of the first and the second counter shafts (12, 14), and the second pair of pressure combs (50, 52) are laterally located on outer teeth of the gear wheel (20) of the drive output shaft (22).

8. The range-change transmission according to claim 7, wherein the first pair of pressure combs (54, 56) are arranged closely adjacent to the outer teeth of the loose gear wheel (6) and have lateral pressure surfaces which engage with lateral pressure surfaces on the first gear wheels (8, 10) of the first and the second counter shafts (12, 14) and the second pair of pressure combs (50, 52) are arranged closely adjacent the outer teeth of the output gear wheel (20) and have lateral pressure surfaces which engage with lateral pressure surfaces on the second gear wheels (16, 18) of the first and the second counter shafts (12, 14).

9. A range-change transmission comprising:
an input shaft (4);
a gearshift sleeve (42), having radially outer teeth (48), being rotationally fixed to and axially slidable along an end of the input shaft (4) between at least first and second positions and a neutral position;
a first counter shaft (12) and a second counter shaft (14) each consisting solely of an integrally formed first gear wheel (8, 10) and an integrally formed second gear wheel (16, 18);
a loose gear wheel (6), having radially inner teeth (44) and radially outer teeth, being rotatably supported by the input shaft (4) and axially movable therealong, the loose gear wheel (6) engages the first gear wheel (8, 10) of the first counter shaft (12) and a second counter shaft (14), respectively;
a drive output shaft (22) being coaxially aligned with the input shaft (4), the drive output shaft (22) having radially inner teeth (46) at a first end located adjacent the input shaft (4) and double conical-roller bearings (26, 28) radially and axially support the drive output shaft (22) within a housing (30);
an output gear wheel (20) being fixedly secured to the drive output shaft (22), and the output gear wheel (20) engaging the second gear wheels (16, 18) of the first counter shaft (12) and the second counter shaft (14);
in the first position of the gearshift sleeve (42), the gearshift sleeve (42) being at least partially located between the input shaft (4) and the loose gear wheel (6) such that the radially outer teeth (48) of the gearshift sleeve (42) engage with the radially inner teeth (44) of the loose gear wheel (6) and the input shaft (4) drives the output shaft (22) via the first and the second counter shafts (12, 14);
in the second position of the gearshift sleeve (42), the gearshift sleeve (42) being at least partially received within a the first end of the drive output shaft (22) and the loose gear wheel (6) such that the radially outer teeth (48) of the gearshift sleeve (42) engage with the radially inner teeth (46) of the drive output shaft (22) so that the input shaft (4) directly drives the drive output shaft (22) via the gearshift sleeve (42);
the drive output shaft (22) being axially mounted in the housing (30) by a pair of conical-roller bearings (26 and 28);
an exterior surface of the first and the second counter shafts (12, 14) at a first axial end is radially supported on a housing (30) by a first bearing (36, 40) and the exterior surface of the first and the second counter shafts (12, 14) at second axial end is radially supported by a second bearing (34, 38);
a first pair of pressure combs (54, 56) are carried by and directly contact opposed sides of the loose gear wheel (6) for maintaining the loose gear wheel (6) in axial alignment with the first gear wheels (8, 10) of the first and the second counter shafts (12, 14), and the first pair of pressure combs (54, 56) are laterally located on outer teeth of the loose gear wheel (6) for solely centering the loose gear wheel (6) relative to the first gear wheels (8, 10) of the first and the second counter shafts (12, 14) and concentrically with respect to the input shaft (4) such that the loose gear wheel (6) can move axially relative to the input shaft (4); and a second pair of pressure combs (50, 52) are carried by and directly contact opposed sides of the output gear wheel (20) for maintaining the output gear wheel (20) in axial alignment with the second gear wheels (16, 18) of the first and the second counter shafts (12, 14), and the second pair of pressure combs (50, 52) are laterally located on outer teeth of the gear wheel (20) of the drive output shaft (22).

10. The range-change transmission according to claim 7, wherein each of the first and the second gear wheels (8, 10, 16, 18) and the output gear wheel (20) has helical teeth.

11. The range-change transmission according to claim 9, wherein each of the first and the second gear wheels (8, 10, 16, 18) and the output gear wheel (20) has helical teeth.

12. The range-change transmission according to claim 10, wherein an exterior surface of the first and the second counter shafts (12, 14) at a first axial end is radially supported on the housing (30) by a first bearing (36, 40) and the exterior surface of the first and the second counter shafts (12, 14) at second axial end is radially supported by a second bearing (34, 38).

13. The range-change transmission according to claim 11, wherein each of the first counter shaft (12) and the second counter shaft (14) rotates about a rotational axis and has a radially uninterrupted cross section along a plane that is coincident with the respective rotational axis of the first and the second counter shafts (12, 14).

* * * * *